United States Patent
Tsukamoto et al.

(10) Patent No.: US 7,193,949 B2
(45) Date of Patent: Mar. 20, 2007

(54) METHOD FOR RECORDING DATA ON OPTICAL RECORDING MEDIUM, DEVICE FOR RECORDING DATA ON OPTICAL RECORDING MEDIUM, AND OPTICAL RECORDING MEDIUM

(75) Inventors: Syuji Tsukamoto, Tokyo (JP); Takashi Horai, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/527,485

(22) PCT Filed: Sep. 8, 2003

(86) PCT No.: PCT/JP03/11455

§ 371 (c)(1),
(2), (4) Date: Mar. 9, 2005

(87) PCT Pub. No.: WO2004/023460

PCT Pub. Date: Mar. 18, 2004

(65) Prior Publication Data

US 2006/0039261 A1 Feb. 23, 2006

(30) Foreign Application Priority Data

Sep. 9, 2002 (JP) ............................ 2002-262711

(51) Int. Cl.
*G11B 7/00* (2006.01)

(52) U.S. Cl. .................. 369/59.11; 369/47.5; 369/116; 369/59.12

(58) Field of Classification Search .................. None
See application file for complete search history.

(56) References Cited

U.S. PATENT DOCUMENTS

| | | | | |
|---|---|---|---|---|
| 5,745,467 A | * | 4/1998 | Sakaue et al. | 369/59.11 |
| 6,188,656 B1 | * | 2/2001 | Shoji et al. | 369/47.25 |
| 6,345,026 B1 | * | 2/2002 | Furukawa et al. | 369/59.11 |
| 7,006,419 B2 | * | 2/2006 | Yokoi | 369/59.11 |
| 2001/0005343 A1 | * | 6/2001 | Shoji et al. | 369/47.51 |
| 2001/0017833 A1 | | 8/2001 | Yamada et al. | 369/59.11 |
| 2003/0067856 A1 | * | 4/2003 | Toda et al. | 369/59.11 |
| 2003/0081523 A1 | | 5/2003 | Miyagawa et al. | 369/59.11 |
| 2004/0037197 A1 | * | 2/2004 | Fujiune et al. | 369/53.22 |

FOREIGN PATENT DOCUMENTS

| | | |
|---|---|---|
| JP | 07129959 | 5/1995 |
| JP | 07225947 | 8/1995 |
| JP | 9007176 | 1/1997 |
| JP | 2000276736 | 10/2000 |
| JP | 2001143265 | 5/2001 |
| JP | 2001-222819 | 8/2001 |
| JP | 2001-243655 | 9/2001 |
| JP | 2002015426 | 1/2002 |
| JP | 2002150563 | 5/2002 |
| JP | 2002237037 | 8/2002 |
| JP | 2003-178448 | 6/2003 |
| WO | 98/28735 | 7/1998 |

* cited by examiner

OTHER PUBLICATIONS

Narumi, K. et al., "45GB Rewritable Dual-Layer Phase-Change Optical Disk With A Transmittance Balanced Structure", Technical Digest, International Symposium on Optical Memory 2001, Grand Hotel, Taipei, Taiwan, Oct. 16-19, 2001, pp. 202 & 203.

*Primary Examiner*—Wayne Young
*Assistant Examiner*—Minerva Rivero
(74) *Attorney, Agent, or Firm*—Seed IP Law Group PLLC

(57) ABSTRACT

A method is provided for recording data in a write-once type optical recording medium which can record data by forming a recording mark having a desired length and reduce jitter of a reproduced signal. The method comprises determining a pulse train pattern so that a level of a pulse is switched from the level corresponding to the level of the recording power Pw to the level corresponding to the level of the bottom power Pb in accordance with the length of a blank region to be formed immediately after formation of a first recording mark and the length of a second recording mark formed subsequent to the formation of the first recording mark.

16 Claims, 3 Drawing Sheets

METHOD FOR RECORDING DATA ON OPTICAL RECORDING MEDIUM, DEVICE FOR RECORDING DATA ON OPTICAL RECORDING MEDIUM, AND OPTICAL RECORDING MEDIUM

BACKGROUND OF THE INVENTION

1. Field of the Invention

The present invention relates to a method for recording data in an optical recording medium, an apparatus for recording data in an optical recording medium and an optical recording medium, and particularly, to a method for recording data in a write-once type optical recording medium, an apparatus for recording data in a write-once type optical recording medium and a write-once type optical recording medium which can record data by forming a recording mark having a desired length and reduce jitter of a reproduced signal.

2. Description of the Related Art

Optical recording media such as the CD, DVD and the like have been widely used as recording media for recording digital data. These optical recording media can be roughly classified into optical recording media such as the CD-ROM and the DVD-ROM that do not enable writing and rewriting of data (ROM type optical recording media), optical recording media such as the CD-R and DVD-R that enable writing but not rewriting of data (write-once type optical recording media), and optical recording media such as the CD-RW and DVD-RW that enable rewriting of data (data rewritable type optical recording media).

As well known in the art, data are generally recorded in a ROM type optical recording medium using pre-pits formed in a substrate in the manufacturing process thereof, while in a data rewritable type optical recording medium a phase change material is generally used as the material of the recording layer and data are recorded utilizing changes in an optical characteristic caused by phase change of the phase change material.

On the other hand, in a write-once type optical recording medium, an organic dye such as a cyanine system dye, phthalocyanine system dye or azo dye is generally used as the material of the recording layer and data are recorded utilizing changes in an optical characteristic caused by chemical change of the organic dye, or chemical change and physical change of the organic dye.

In this specification, a region in which an organic dye chemically changes or chemically and physically changes when a write-once type optical recording medium is irradiated with a laser beam is referred to as "a recording mark".

When data are to be recorded in a write-once type optical recording medium, it is general that the power of a laser beam is set to a sufficiently high recording power Pw when the laser beam is to be projected onto a region where a recording mark is to be formed and that the power of the laser beam is set to a sufficiently low bottom power Pb when the laser beam is to be projected onto a region where no recording mark is to be formed, namely, a blank region, thereby projecting the laser beam onto the recording layer of the write-once type optical recording medium.

Therefore, in the region onto which the laser beam whose power is set to the recording power Pw is projected, the organic dye contained in the region of the recording layer is decomposed and transformed and the recording layer and a substrate are deformed by a pressure caused by the decomposition and transformation of the organic dye, thereby forming a recording mark. On the other hand, in the region onto which the laser beam whose power is set to the bottom power Pb is projected, neither the decomposition and transformation of the organic dye contained in the recording layer nor the deformation of the substrate occurs, so that a blank region is formed.

Thus, data can be recorded in a write-once type optical recording medium by modulating the power of the laser beam to be projected onto the optical recording medium in this manner while the optical recording medium is being rotated.

However, since heat generated in the recording layer by being irradiated with the laser beam is quickly transferred from the region onto which the laser beam is projected to ambient regions, even in regions other than the region onto which the laser beam whose power is set to the recording power Pw is projected, the organic dye contained therein sometimes is decomposed and transformed and on the other hand, in the region onto which the laser beam whose power is set to the recording power Pw is projected, deformation of the substrate sometimes fails to occur. As a result, it is sometimes impossible to form a recording mark in a desired manner.

Therefore, in the case where data are recorded in the recording layer using a simple pulse train pattern determined so that the power of the laser beam to be projected onto a region where a recording mark is to be formed is set to the recording power Pw and that the power of the laser beam to be projected onto a blank region where no recording mark is to be formed is set to the bottom power Pb, the shape of a recording mark formed in the recording layer sometimes becomes inappropriate or heat generated by the laser beam projected for forming a recording mark sometimes affects another recording mark to deform it so that a reproduced signal having good signal characteristics cannot be obtained.

These problems become prominent as the linear recording velocity becomes higher and in the case of recording data in a DVD-R in which data are normally recorded at a linear recording velocity of about 3.5 m/sec at a linear recording velocity higher than 2× speed or a linear recording velocity higher than 4× speed, these problems become particularly prominent.

Further, the same problems occur not only in a write-once type optical recording medium having a recording layer containing an organic dye but also in other kinds of a write-once type optical recording medium such as that having a recording layer consisting of a plurality of layered inorganic films.

BRIEF SUMMARY OF THE INVENTION

It is therefore an object of the present invention to provide a method for recording data in a write-once type optical recording medium which can record data by forming a recording mark having a desired length and reduce jitter of a reproduced signal.

It is another object of the present invention to provide an apparatus for recording data in a write-once type optical recording medium which can record data by forming a recording mark having a desired length and reduce jitter of a reproduced signal.

It is a further object of the present invention to provide a write-once type optical recording medium which can record data by forming a recording mark having a desired length and reduce jitter of a reproduced signal.

The inventors of the present invention vigorously pursued a study for accomplishing the above objects and, as a result, made the discovery that the reason why a recording mark having a desired length could not be formed when data were recorded by irradiating a recording layer of an optical recording medium with a laser beam whose power was modulated in accordance with a pulse train pattern including at least a pulse whose level was set to a level corresponding to the level of the recording power and a pulse whose level was set to a level corresponding to the level of the bottom power and forming a plurality of recording marks in the recording layer of the optical recording medium was that the length of the recording mark was influenced by the length of the recording mark itself, the length of a blank region formed immediately after the formation of the recording mark or the length of the next recording mark.

The present invention is based on these findings and the above objects of the present invention can be accomplished by a method for recording data in an optical recording medium constituted so as to project a laser beam whose power is modulated in accordance with a pulse train pattern including at least a pulse whose level is set to a level corresponding to a level of a recording power and a pulse whose level is set to a level corresponding to a level of a bottom power onto a write-once type optical recording medium including a substrate and at least one recording layer formed on the substrate and form at least two recording marks in the at least one recording layer, thereby recording data, the method for recording data in an optical recording medium comprising a step of determining a pulse train pattern so that a level of a pulse is switched from a level corresponding to the level of the recording power to a level corresponding to the level of the bottom power in accordance with at least one of a length of a first recording mark, a length of a blank region to be formed immediately after formation of the first recording mark and a length of a second recording mark formed subsequent to the formation of the first recording mark, modulating a power of laser beam in accordance with the thus determined pulse train pattern, projecting the laser beam onto the at least one recording layer and forming the first recording mark.

In this specification, a region in which an organic dye contained in a recording layer is decomposed and transformed and a substrate is deformed is referred to as "a recording mark" and other regions are referred to as "blank regions".

According to the present invention, since the pulse train pattern is determined so that a level of a pulse is switched from a level corresponding to the level of the recording power to a level corresponding to the level of the bottom power in accordance with the length of a first recording mark, the length of a blank region to be formed immediately after the formation of the first recording mark or the length of a second recording mark formed subsequent to the formation of the first recording mark, the first recording mark can be formed so that the length thereof is not influenced by the length of the first recording mark itself, the length of a blank region to be formed immediately after the formation of the first recording mark or the length of the second recording mark and it is therefore possible to form a recording mark having a desired length, thereby recording data, and reduce jitter of a reproduced signal.

In a preferred aspect of the present invention, a delay time period T3 between a fall time of a data pulse corresponding to the first recording mark and a time at which the level of a pulse is switched from the level corresponding to the level of the recording power to the level corresponding to the level of the bottom power in the pulse train pattern used for forming the first recording mark is set so as to satisfy the formula below, wherein T3 (x1, y, z) is a delay time period T3 in the case of forming the first recording mark having length x1, the blank region having length y after the formation of the first recording mark and the second recording mark having length z and T3 (x2, y, z) is a delay time period T3 in the case of forming the first recording mark having length x2, the blank region having length y after the formation of the first recording mark and the second recording mark having length z, where x1 is smaller than x2.

$$T3(x1, y, z) > T3(x2, y, z).$$

According to this preferred aspect of the present invention, in the case of forming the blank region having the same length y of the blank region after the formation of the first recording mark and forming the second recording mark having the same length z, since the delay time period T3 is set longer as the length x of the first recording mark is shorter, it is possible to prevent the rear edge portion of the first recording mark from extending forward and prevent the first recording mark from becoming shorter and it is therefore possible to form a recording mark having a desired length, thereby recording data, and reduce jitter of a reproduced signal.

In a preferred aspect of the present invention, a delay time period T3 between a fall time of a data pulse corresponding to the first recording mark and a time at which the level of a pulse is switched from the level corresponding to the level of the recording power to the level corresponding to the level of the bottom power in the pulse train pattern used for forming the first recording mark is set so as to satisfy the formula below, wherein T3 (x, y1, z) is a delay time period T3 in the case of forming the blank region having length y1 after the formation of the first recording mark having length x and the second recording mark having length z and T3 (x, y2, z) is a delay time period T3 in the case of forming the blank region having length y2 after the formation of the first recording mark having length x and the second recording mark having length z, where y1 is smaller than y2

$$T3(x, y1, z) > T3(x, y2, z).$$

According to this preferred aspect of the present invention, in the case of forming the first recording mark having the same length x and the second recording mark having the same length z after and before the blank region having length y1 or y2, since the delay time period T3 is set longer as the length y of the blank region is shorter, it is possible to prevent the rear edge portion of the first recording mark from extending forward and prevent the first recording mark from becoming shorter and it is therefore possible to form a recording mark having a desired length, thereby recording data, and reduce jitter of a reproduced signal.

In a preferred aspect of the present invention, a delay time period T3 between a fall time of a data pulse corresponding to the first recording mark and a time at which the level of a pulse is switched from the level corresponding to the level of the recording power to the level corresponding to the level of the bottom power in the pulse train pattern used for forming the first recording mark is set so as to satisfy the formula below, wherein T3 (x, y, z1) is a delay time period T3 in the case of forming the blank region having length y after the formation of the first recording mark having length x and the second recording mark having length z2 and T3 (x, y, z2) is a delay time period T3 in the case of forming the blank region having length y after the formation of the first recording mark having length x and the second recording mark having length z2, where z1 is smaller than z2

$$T3(x, y, z1) > T3(x, y, z2).$$

According to this preferred aspect of the present invention, in the case of forming the first recording mark having the same length x and the blank region having the same length y before the second recording mark having length y1 or y2, since the delay time period T3 is set longer as the length z of the second recording mark is shorter, it is possible to prevent the rear edge portion of the first recording mark from extending forward and prevent the first recording mark from becoming shorter and it is therefore possible to form a recording mark having a desired length, thereby recording data, and reduce jitter of a reproduced signal.

In a further preferred aspect of the present invention, in the case of forming the blank region having length y after the formation of the first recording mark having length x and the second recording mark having length z, a value T3'(x, y, z: VL) obtained by normalizing a delay time period T3 set for forming the first recording mark having length x and recording data at a linear recording velocity VL with a channel bit period and a value T3'(x, y, z: VH) obtained by normalizing a delay time period T3 set for forming the first recording mark having length x and recording data at a linear recording velocity VH higher than the linear recording velocity VL with the channel bit period are set so as to satisfy the following formula $T3'(x, y, z: VL) < T3'(x, y, z: VH)$.

Here, the value T3' obtained by normalizing a delay time period T3 with the channel bit period means k when the delay time period T3 is represented as k–T. In other words, in the present invention, a value obtained by dividing an actual time of a delay time period T3 at the linear recording velocity VH by a period 1T at the linear recording velocity VH is set larger than a value obtained by dividing a delay time period T3 at the linear recording velocity VL by a period 1T at the linear recording velocity VL.

Since in the case of recording data at a higher linear recording velocity, a time period between a fall time at which the level of the laser power is lowered from the level corresponding to the level of the recording power to the level corresponding to the level of the bottom power for forming the rear edge potion of the first recording mark and a time at which the level of the laser power is raised from the level corresponding to the level of the bottom power to the level corresponding to the level of the recording power for forming the front edge portion of the second recording mark becomes shorter that that in the case of recording data at a lower linear recording velocity, thermal interference between adjacent recording marks tends to occur. However, according to the present invention, since the value T3' obtained by normalizing a delay time period T3 with the channel bit period is set greater as the linear recording velocity is higher, even in the case of recording data in the optical recording medium at a higher linear recording velocity, it is possible to prevent adjacent recording marks from thermally interfering with each other and it is therefore possible to form a recording mark having a desired length, thereby recording data, and reduce jitter of a reproduced signal.

According to this preferred aspect of the present invention, in the case of forming the blank region having the same length y after the formation of the first recording mark and the second recording mark having length z, since the value T3' obtained by normalizing a delay time period T3 with the channel bit period is set greater when the first recording mark having length x as the linear recording velocity is higher, even in the case of recording data in the optical recording medium at a higher linear recording velocity, it is possible to prevent the rear edge portion of the first recording mark from extending forward and it is therefore possible to form a recording mark having a desired length, thereby recording data, and reduce jitter of a reproduced signal.

In a preferred aspect of the present invention, the time at which the level of the pulse of the pulse train pattern used for forming the first recording mark is switched from a level corresponding to the level of the bottom power to a level corresponding to the level of the recording power is determined in accordance with at least one of the length of the first recording mark and a length of a blank region to be formed before the formation of the first recording mark.

Since the length of the first recording mark also varies depending upon the length of the first recording mark or the length of a blank region to be formed before the formation of the first recording mark, it is preferable to determine the time at which the level of the pulse of the pulse train pattern used for forming the first recording mark is switched from a level corresponding to the level of the bottom power to a level corresponding to the level of the recording power in accordance with the length of the first recording mark or the length of a blank region to be formed before the formation of the first recording mark. Therefore, according to this preferred aspect of the present invention, since the time at which the level of the pulse of the pulse train pattern used for forming the first recording mark is switched from a level corresponding to the level of the bottom power to a level corresponding to the level of the recording power is determined in accordance with at least one of the length of the first recording mark and the length of a blank region to be formed before the formation of the first recording mark, it is possible to prevent the front edge portion of a recording mark from extending toward a preceding recording mark and prevent the recording mark from becoming longer and it is therefore possible to form a recording mark having a desired length, thereby recording data, and reduce jitter of a reproduced signal.

In a preferred aspect of the present invention, a delay time period T1 between a rise time of a data pulse corresponding to the first recording mark and a time at which the level of a pulse is switched from the level corresponding to the level of the bottom power to the level corresponding to the level of the recording power in the pulse train pattern used for forming the first recording mark is set so as to satisfy the formula below, wherein T1 (a1, b) is a delay time period in the case of forming the first recording mark having length b after formation of a blank region having length a1 and T1 (a2, b) is a delay time period in the case of forming the first recording mark having length b after formation of a blank region having length a2 longer than a1

$T1(a1, b) > T1(a2, b)$.

According to this preferred aspect of the present invention, when a recording mark having length b is to be recorded, since the delay time period T1 is set longer as the length a of a blank region to be formed before the formation of the recording mark is shorter, it is possible to prevent the front edge portion of a recording mark from becoming offset and it is therefore possible to form a recording mark having a desired length.

In another preferred aspect of the present invention, a delay time period T1 between a rise time of a data pulse corresponding to the first recording mark and a time at which the level of a pulse is switched from the level corresponding to the level of the bottom power to the level corresponding to the level of the recording power in the pulse train pattern used for forming the first recording mark is set so as to satisfy the formula below, wherein T1 (a, b1) is a delay time period in the case of forming a recording mark having length b1 after formation of a blank region having length a and T1 (a, b2) is a delay time period in the case of forming a recording mark having length b2 longer than b1 after formation of a blank region having length a $T1(a, b1) < T1(a, b2)$.

According to this preferred aspect of the present invention, since the delay time period T1 is set longer as the length b of a recording mark to be formed after the formation of a blank region having the same length a is shorter, it is possible to prevent the front edge portion of a recording mark from becoming offset and it is therefore possible to form a recording mark having a desired length.

Since the influence of the length of a blank region to be formed after the formation of the first recording mark and the length of the second recording mark on the length of the first recording mark becomes greater as the length of the first recording mark is smaller, the present invention is most effective in the case where the first recording mark is the shortest recording mark.

The above objects of the present invention can be also accomplished by an apparatus for recording data in an optical recording medium constituted so as to project a laser beam onto a write-once type optical recording medium including a substrate and at least one recording layer formed on the substrate and form at least two recording marks in the at least one recording layer, thereby recording data and comprising a laser projecting means for projecting a laser beam whose power is modulated in accordance with a pulse train pattern including at least a pulse whose level is set to a level corresponding to a level of a recording power and pulse whose level is set to a level corresponding to a level of a bottom power onto the optical recording medium, the laser projecting means being adapted for projecting the laser beam whose power is modulated in accordance with a pulse train pattern determined so that a level of a pulse is switched from a level corresponding to the level of the recording power to a level corresponding to the level of the bottom power in accordance with at least one of a length of a first recording mark, a length of a blank region to be formed immediately after formation of the first recording mark and a length of a second recording mark formed subsequent to the formation of the first recording mark onto the optical recording medium, thereby forming the first recording mark in the at least one recording layer.

In a preferred aspect of the present invention, the laser projecting means is constituted so as to project the laser beam whose power is modulated in accordance with a pulse train pattern in which the time at which the level of the pulse of thereof is switched from a level corresponding to the level of the bottom power to a level corresponding to the level of the recording power is determined in accordance with at least one of the length of the first recording mark and a length of a blank region to be formed before the formation of the first recording mark and form the first recording mark.

The above objects of the present invention can be also accomplished by a write-once type optical recording medium comprising a substrate and at least one recording layer and constituted so that at least two recording marks are formed and data are recorded in the at least one recording layer thereof when it is irradiated with a laser beam whose power is modulated in accordance with a pulse train pattern including at least a pulse whose level is set to a level corresponding to a level of a recording power and a pulse whose level is set to a level corresponding to a level of a bottom power, which optical recording medium is further constituted to be recorded with a program for setting recording conditions necessary for determining the pulse train pattern so that a level of a pulse is switched from a level corresponding to the level of the recording power to a level corresponding to the level of the bottom power in accordance with at least one of a length of a first recording mark, a length of a blank region to be formed immediately after formation of the first recording mark and a length of a second recording mark formed subsequent to the formation of the first recording mark.

According to the present invention, since the optical recording medium is constituted to be recorded with a program for setting recording conditions necessary for determining the pulse train pattern so that a level of a pulse is switched from a level corresponding to the level of the recording power to a level corresponding to the level of the bottom power in accordance with at least one of a length of a first recording mark, a length of a blank region to be formed immediately after formation of the first recording mark and a length of a second recording mark formed subsequent to the formation of the first recording mark, it is possible to modulate the power of a laser beam so that a recording mark having a desired length can be formed when data are to be recorded by projecting the laser beam thereonto and it is therefore possible to form a recording mark having a desired length, thereby recording data, and reduce jitter of a reproduced signal.

In a preferred aspect of the present invention, the optical recording medium is constituted to be recorded with a program for setting recording conditions necessary for determining the time at which the level of the pulse of the pulse train pattern used for forming the first recording mark is switched from a level corresponding to the level of the bottom power to a level corresponding to the level of the recording power in accordance with at least one of the length of the first recording mark and a length of a blank region to be formed before the formation of the first recording mark.

According to this preferred aspect of the present invention, since the optical recording medium is constituted to be recorded with a program for setting recording conditions necessary for determining the time at which the level of the pulse of the pulse train pattern used for forming the first recording mark is switched from a level corresponding to the level of the bottom power to a level corresponding to the level of the recording power in accordance with at least one of the length of the first recording mark and a length of a blank region to be formed before the formation of the first recording mark, it is possible to modulate the power of a laser beam so that a recording mark having a desired length can be formed when data are to be recorded by projecting the laser beam thereonto and it is therefore possible to form a recording mark having a desired length, thereby recording data, and reduce jitter of a reproduced signal.

The above and other objects and features of the present invention will become apparent from the following description made with reference to the accompanying drawings.

DETAILED DESCRIPTION OF THE INVENTION

Preferred embodiments of the present invention will now be described with reference to accompanying drawings.

Figure 1:
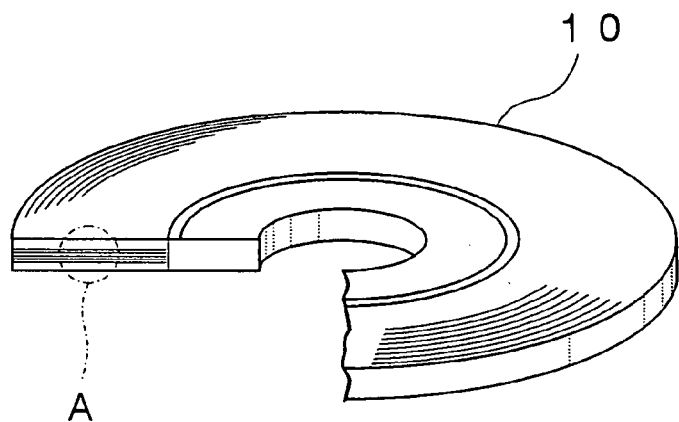
FIG. 1 is a schematic perspective view showing an optical recording medium that is a preferred embodiment of the present invention.
Figure 2:
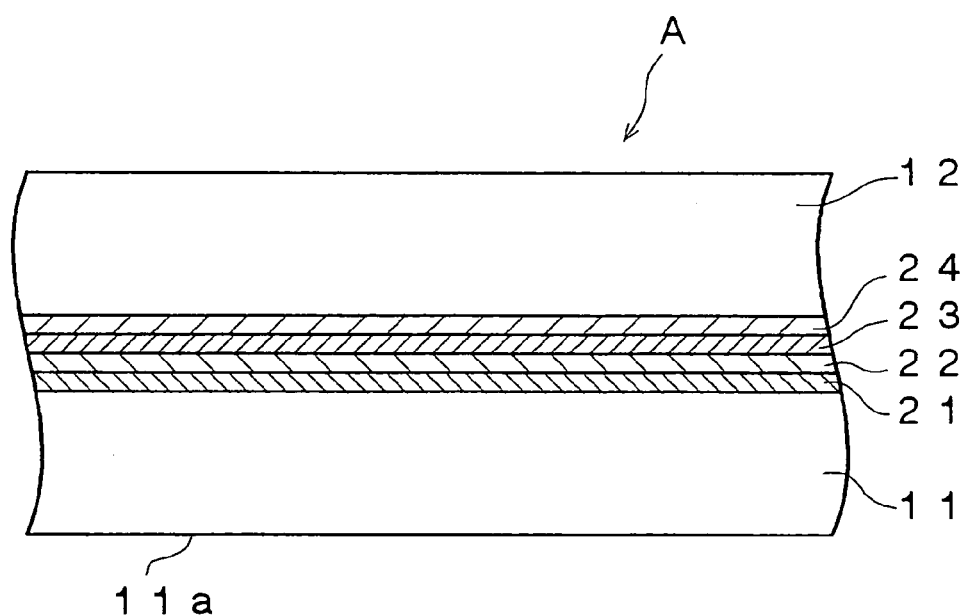
FIG. 2 is an enlarged schematic cross-sectional view of the part of the optical recording medium indicated by A in FIG. 1.

FIG. 1 is a schematic perspective view showing an optical recording medium that is a preferred embodiment of the present invention and FIG. 2 is an enlarged schematic cross-sectional view of the part of the optical recording medium indicated by A in FIG. 1.

As shown in FIG. 2, an optical recording medium 10 is constituted as a write-once type optical recording medium of a DVD-R type and includes a light transmissible substrate 11 and dummy substrate 12, and a recording layer 21, a reflective layer 22, a protective layer 23 and an adhesion layer 24.

In the optical recording medium 10 according to this embodiment, a laser beam is projected onto the recording layer 21 via the light transmissible substrate 11 when data are to be recorded in the recording layer 21 or when data recorded in the recording layer 21 are to be reproduced.

In this embodiment, the optical recording medium 10 is formed disc-like and has an outer diameter of about 120 mm and a thickness of about 1.2 mm.

The light transmissible substrate 11 is a layer through which the laser beam passes when data are to be recorded in the recording layer 21 described later or when data recorded in the recording layer 21 are to be reproduced and serves as a support for ensuring mechanical strength required for the optical recording medium 10.

The light transmissible substrate 11 is formed disc-like and has a thickness of about 0.6 mm.

One of the major surfaces of the light transmissible substrate 11 constitutes a light incidence plane 11a through which the laser enters and grooves (not shown) and lands (not shown) are alternately formed on the surface of the other major surface thereof from a portion in the vicinity of the center thereof toward the outer peripheral portion thereof.

The grooves and lands serve as a guide track for the laser beam when data are to be recorded in the recording layer 21 or when data recorded in the recording layer 21 are to be reproduced.

The material used to form the light transmissible substrate 11 is not particularly limited insofar as it has sufficiently high light transmittance with respect to light in the wavelength region of the laser beam and the light transmissible substrate 11 can be formed of glass, ceramic, resin or the like. Among these, resin is preferably used for forming the light transmissible substrate 11 since resin can be easily shaped. Illustrative examples of resins suitable for forming the light transmissible substrate 11 include polycarbonate resin, acrylic resin, epoxy resin, polystyrene resin, polyethylene resin, polypropylene resin, silicone resin, fluoropolymers, acrylonitrile butadiene styrene resin, urethane resin and the like. Among these, polycarbonate resin is most preferably used for forming the substrate 11 from the viewpoint of easy processing, optical characteristics and the like.

The dummy substrate 12 is a disc-like substrate used for ensuring that the optical recording medium 10 has a thickness of about 1.2 mm and is formed so as to have a thickness of about 0.6 mm, similarly to the light transmissible substrate 11.

The material used to form the dummy substrate 12 is not particularly limited and the dummy substrate 12 can be formed of glass, ceramic, resin or the like, similarly to the light transmissible substrate 11.

In this embodiment, since the laser beam is projected onto the recording layer 21 via the light transmissible substrate 11 located opposite to the dummy substrate 12, it is not necessary for the dummy substrate 12 to have a light transmissible property.

As shown in FIG. 2, the recording layer 21 is formed on the surface of the light transmissible substrate 11.

The recording layer 21 serves to record data.

The recording layer 21 contains an organic dye such as a cyanine system dye, a merocyanine system dye, a methine system dye, a derivative of such a dye, a benzenethiol metal complex, a phthalocyanine dye, a naphthalocyanine dye, an azo dye or the like.

When a laser beam whose power is set to be equal to or higher than a predetermined level is projected onto the recording layer 21, the organic dye contained in the region of the recording layer 21 irradiated with the laser beam is decomposed and transformed. In some cases, the recording layer 21 and the light transmissible substrate 11 are deformed due to a pressure produced by the decomposition and transformation of the organic dye. Thus, optical characteristics of the region irradiated with the laser beam are changed.

In this specification, a region in which an organic dye contained in a recording layer 21 is decomposed and transformed is referred to as "a recording mark" and other regions are referred to as "blank regions".

The recording mark and the blank region respectively correspond to "1" and "0" of data recorded in the optical recording medium 10, and the length of the recording mark (the length between the front edge portion and the rear edge portion of the recording mark) and the length of the blank region (the length between the rear edge portion of the recording mark and the front edge portion of a following recording mark) correspond to the number of bits of data recorded in the optical recording medium 10.

Each of the recording mark and the blank region is formed so as to have a length of an integral multiple of T, where T is a length corresponding to one period of a clock used as a reference. Concretely, in the case where the 8/16 modulation Code is employed as a data modulation code as in a DVD-R, each of the recording mark and the blank region is formed so as to have a length of any one of 3T to 11T and 14T.

As shown in FIG. 2, the reflective layer 22 is formed on the surface of the recording layer 21.

The reflective layer 22 serves to reflect the laser beam projected onto the recording layer 21 via the light transmissible substrate 11 so as to emit it from the light transmissible substrate 11.

The material for forming the reflective layer 21 is not particularly limited insofar as it can reflect the laser beam and the reflective layer 21 can be formed of Mg, Al, Ti, Cr, Fe, Co, Ni, Cu, Zn, Ge, Ag, Pt, Au or the like. Among these, a metal material such as Al, Au, Ag and Cu or an alloy containing at least one of these metals such as an alloy of Ag and Cu is preferably used for forming the reflective layer 22 because it has high reflective coefficient.

As shown in FIG. 2, the protective layer 23 is formed on the surface of the reflective layer 22.

The protective layer 23 serves to physically or chemically protect the recording layer 21 and the reflective layer 22.

The material for forming the protective layer 23 is not particularly limited insofar as it can physically or chemically protect the recording layer 21 and the reflective layer 22 but it is preferable to form the protective layer 23 of ultraviolet ray curable resin or the like.

As shown in FIG. 2, the adhesion layer 24 is formed on the surface of the protective layer 23.

The adhesion layer 24 serves to adhere a multi-layered unit consisting of the light transmissible substrate 11, the recording layer 21, the reflective layer 22 and the protective layer 23 with the dummy substrate 12.

The material for forming the adhesion layer 24 is not particularly limited insofar as it can adhere the multi-layered unit consisting of the light transmissible substrate 11, the recording layer 21, the reflective layer 22 and the protective layer 23 with the dummy substrate 12 but it is preferable to form the adhesion layer 24 of ultraviolet ray curable resin or the like.

The optical recording medium having the above described configuration can, for example, be fabricated in the following manner.

The light transmissible substrate 11 having the grooves and the lands on the surface thereof is first fabricated by an injection molding process. Similarly, the dummy substrate 12 is fabricated by an injection molding process.

Then, the recording layer 22 is formed on the surface of the light transmissible substrate 11 formed with the grooves and the lands. The recording layer 21 can be formed, for example, by applying a solvent containing an organic dye onto the light transmissible substrate 11 using a spin coating process and evaporating the solvent.

Further, the reflective layer 22 is formed on the surface of the recording layer 21. The reflective layer 22 can be formed by a gas phase growth process using chemical species containing elements of the reflective layer 22. Illustrative examples of the gas phase growth process include vacuum deposition process, sputtering process and the like.

Then, the protective layer 23 is formed on the surface of the reflective layer 22. The protective layer 23 can be formed, for example, by applying acrylic ultraviolet ray curable resin or epoxy ultraviolet ray curable resin whose viscosity is adjusted onto the reflective layer 22 using a spin coating process to form a coating layer and projecting an ultraviolet ray onto the coating layer to cure it.

Further, the adhesive layer 24 is formed on the surface of the protective layer 23. The adhesive layer 24 can be formed, for example, by applying ultraviolet ray curable resin whose viscosity has been adjusted onto the reflective layer 22 using a spin coating process.

Then, the multi-layered unit obtained by forming the recording layer 21, the reflective layer 22, the protective layer 23 and the adhesion layer 24 on the surface of the light transmissible substrate 11 in this order is bonded onto the dummy substrate 12 via the adhesion layer 24 and the adhesion layer 24 is irradiated with an ultraviolet ray from the side of the dummy substrate 12, thereby curing the adhesion layer 24. As a result, the multi-layered unit obtained by forming the recording layer 21, the reflective layer 22, the protective layer 23 and the adhesion layer 24 on the surface of the light transmissible substrate 11 in this order is adhered onto the dummy substrate 12.

This completes the fabrication of the optical recording medium 10.

Data are recorded in the optical recording medium 10 having the above described configuration in the following manner, for example.

When data are to be recorded in the optical recording medium 10, a laser beam whose power is modulated is projected onto the recording layer 21 of the optical recording medium 10 via the light incidence plane 11a while the optical recording medium 10 is being rotated, thereby recording data.

It is necessary to set the power of the laser beam to a level high enough for decomposing and transforming the organic dye contained in the recording layer 21 when a recording mark is to be formed in the recording layer 21 and on the other hand, it is necessary to set the power of the laser beam to a level at which an organic dye contained in the recording layer 21 is neither decomposed nor transformed when a blank region is to be formed in the recording layer 2.

Therefore, when data are to be recorded in the optical recording medium 10, the power of the laser beam projected onto a region where a recording mark is to be formed is set to a recording power Pw and the power of the laser beam projected onto a region where a blank region is to be formed is set to a bottom power Pb.

Owing to heat transfer, however, the actual length of a recording mark formed in the recording layer 21 does not accurately correspond to the time period during which the laser beam whose power was set to the recording power Pw was projected onto the recording layer 21.

Therefore, when the power of the laser beam is to be modulated, it is necessary to take into account not only the length of the recording mark to be formed but also the lengths of blank regions to be formed before and after the formation of the recording mark, the lengths of recording marks to be formed adjacently, the linear recording velocity and the like, and determine the time at which the power of the laser beam is switched from the bottom power Pb to the recording power Pw and the time at which the power of the laser beam is switched from the recording power Pw to the bottom power Pb.

Figure 3:
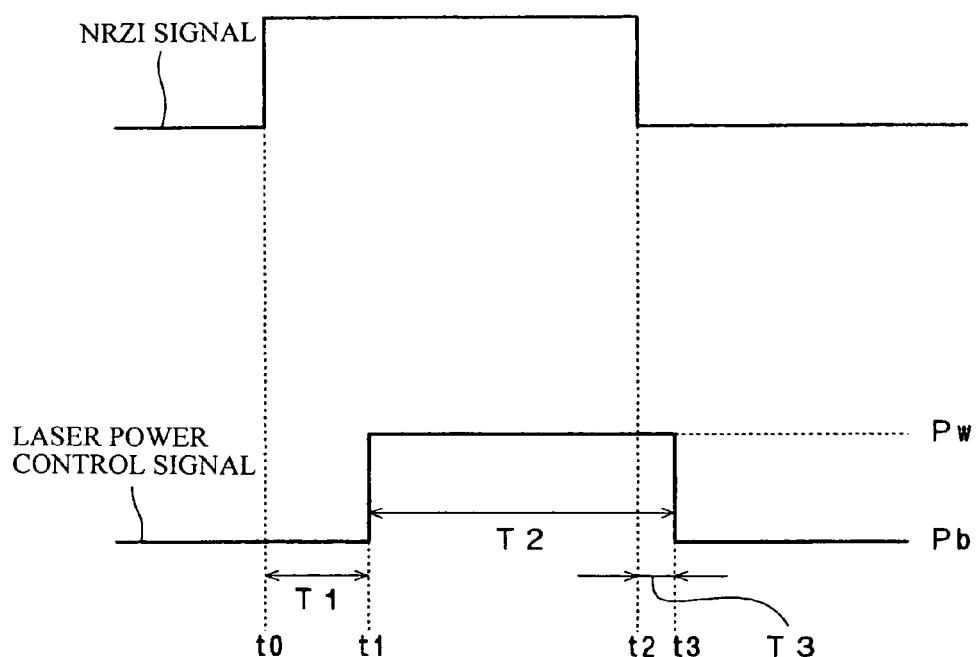
FIG. 3 is a diagram showing a data pulse of an NRZI signal and a pulse pattern of a laser power control signal used in a preferred embodiment of the present invention.

FIG. 3 is a diagram showing a data pulse of an NRZI signal and a pulse pattern of a laser power control signal used in a preferred embodiment of the present invention.

In this embodiment, the NRZI signal is a signal corresponding to data obtained by effecting NRZI (non-return-to-zero-inverse) modulation processing on data of 16 bits subjected to 8/16 modulation processing and converting the arrangement of "0" and "1" of data into an arrangement suitable for the optical recording medium 10 and, as shown in FIG. 3, the NRZI signal is constituted by a pulse signal whose level is modulated between a level corresponding to "1" of the data subjected to the NRZI modulation processing and a level corresponding to "0" of the data subjected to the NRZI modulation processing.

On the other hand, the laser power control signal is a control signal for controlling the power of a laser beam and, as shown in FIG. 3, the laser power control signal is constituted by a pulse signal whose level is modulated between a level corresponding to the bottom power Pb and a level corresponding to the recording power Pw.

As shown in FIG. 3, in this embodiment, in a pulse train pattern of the laser power control signal, the time t1 at which the level thereof is switched from the bottom power Pb to the recording power Pw is delayed by a time period T1 with respect to the time t0 at which a data pulse of the NRZI signal rises and the time t3 at which the level thereof is switched from the recording power Pw to the bottom power Pb is delayed by a time period T3 with respect to the time t2 at which the data pulse of the NRZI signal falls.

In a write-once type optical recording medium 10 having a recording layer 21 containing an organic dye, it was found that, in the case where a recording mark was formed in the recording layer 21 at a high linear recording velocity, a shorter length of the blank region formed before the formation of a recording mark made the length of the recording mark more liable to be influenced by heat of the laser beam projected for forming the preceding recording mark, whereby the front edge portion of the recording mark extended toward the preceding recording mark and the length of the recording mark became longer. On the other hand, it was found that as the length of a recording mark to be formed in the recording layer 21 at a high linear recording velocity was shorter, heat energy applied to the recording layer 21 by the laser beam was liable to become insufficient, whereby the front edge portion of the recording mark extended rearward and the length of the recording mark became shorter.

Therefore, in this embodiment, the time period T1 is determined in accordance with the length b of the recording mark to be formed and the length a of the blank region to be formed before the formation of the recording mark.

Concretely, firstly, the time period T1 (a1, b) when a recording mark having length b is to be formed after a blank region having length a1 and the time period T1 (a2; b) when a recording mark having the length b is to be formed after a blank region having the length a2 are set so as to satisfy the following formula (1) wherein a1 is shorter than a2

$$T1(a1, b) > T1(a2, b) \quad (1).$$

Specifically, in this embodiment, when a recording mark having length b is to be formed after a blank region having length a, the time period T1 is set longer as the length a of the blank region is shorter.

In a study done by the inventors of the present invention, it was found that in the case of recording data in the recording layer 21 of the optical recording medium 10 at a high linear recording velocity such as 4× speed, namely, about 14 m/sec, the phenomenon of the front edge portion of the recording mark being extended toward the preceding recording mark and the length of the recording mark becoming longer became particularly prominent when the recording mark was formed after a blank region having a length of 3T and that such a phenomenon was not observed when the recording mark was formed after a blank region having a length equal to or longer than 4T.

Therefore, in the case of recording data in the recording layer 21 of the optical recording medium 10 at a high linear recording velocity such as 4× speed, namely, about 14 m/sec, when a recording mark is to be formed after a blank region having a length of 3T, the time period T1 is set so as to satisfy the above mentioned formula (1) and be longer than that when a recording mark is to be formed after a blank region having a length equal to or longer than 4T.

Secondly, a time period T1 (a, b1) when a recording mark having length b1 is to be formed after a blank region having length a and a time period T1 (a, b2) when a recording mark having length b1 is to be formed after a blank region having the same length a are set so as to satisfy the following formula (2) wherein b1 is shorter than b2

$$T1(a, b1) < T1(a, b2) \quad (2).$$

Specifically, in this embodiment, when a recording mark having length b1 or b2 is to be formed after a blank region having the same length a, the time period T1 is set shorter as the length of the recording mark is shorter.

In a study done by the inventors of the present invention, it was found that in the case of recording data in the recording layer 21 of the optical recording medium 10 at a high linear recording velocity such as 4× speed, namely, about 14 m/sec, the offset of the front edge portion of a recording mark caused by the shortage of heat energy became particularly great when a recording mark having a length of 3T or 4T was formed and that when a recording mark having a length equal to or longer than 5T was formed, the offset of the front edge portion of the recording mark caused by the shortage of heat energy was not observed.

Therefore, in the case of recording data in the recording layer 21 of the optical recording medium 10 at a high linear recording velocity such as 4× speed, namely, about 14 m/sec, when a recording mark having a length of 3T is to be formed after a blank region, the time period T1 is set so as to satisfy the above mentioned formula (2) and be longer than that when a recording mark having a length equal to or longer than 4T is to be formed and when a recording mark having a length of 4T is to be formed after a blank region having the same length, the time period T1 is set so as to satisfy the above mentioned formula (2) and be longer than that when a recording mark having a length equal to or longer than 5T. To the contrary, when a recording mark having a length equal to or longer than 5T is to be formed after a blank region having the same length, the time period T1 is set in a conventional manner.

On the other hand, in a write-once type optical recording medium 10 having a recording layer 21 containing an organic dye, it was found that the rear edge portion of a recording mark extended forward and the length of the recording mark became shorter as the length of a blank region to be formed after the recording mark was shorter and it was further found that the rear edge portion of a recording mark extended forward and the length of the recording mark became shorter as the length of the following recording mark was shorter.

In a study done by the inventors of the present invention, it was found that the phenomenon of the rear edge portion of a recording mark being extended forward and the length of the recording mark becoming shorter became prominent as the length of the following recording mark to be formed after the recording mark was shorter.

It is reasonable to assume that the phenomenon of a shorter length of the blank region to be formed after the formation of a recording mark tending to make the rear edge portion of the recording mark extend toward the front edge portion thereof and the length of the recording mark shorter becomes prominent is caused by the fact that as the length of a blank region to be formed after the formation of a recording mark is shorter, the recording mark is liable to be strongly influenced by heat caused by the laser beam projected for forming the following recording mark and appropriate deformation of the light transmissible substrate 11 at the rear edge portion of the recording mark is not readily inhibited, whereby the rear edge portion of the recording mark tends to extend toward the front edge portion thereof.

Further, in a study done by the inventors of the present invention, it was found that the rear edge portion of the recording mark was liable to extend toward the front edge portion thereof and the length of the recording mark became shorter as the length of a recording mark to be sequentially formed was shorter.

It is reasonable to assume that the phenomenon of the rear edge portion of the recording mark being liable to extend toward the front edge portion thereof and the length of the recording mark becoming shorter as the length of a recording mark to be sequentially formed is shorter is caused by the fact that since the time at which the power of the laser beam is switched from the recording power Pw to the bottom power Pb is set so that the time period T1 determined in accordance with the above mentioned formula (2) becomes shorter as the length of a next recording mark to be sequentially formed is shorter, the rear edge portion of the recording mark is liable to be greatly influenced by heat caused by the laser beam projected for forming the next recording mark and appropriate deformation of the light transmissible substrate ii at the rear edge portion of the recording mark is not readily inhibited, whereby the rear edge portion of the recording mark tends to extend toward the front edge portion thereof.

Therefore, in this embodiment, the time period T3 is determined in accordance with the length x of the recording mark to be formed, the length y of the blank region to be formed after the formation of the recording mark and the length z of the next recording mark.

Concretely, firstly, a time period T3 (x1, y, z) when a recording mark having length x1 is to be formed and a time period T3 (x2, y, z) when a recording mark having length x2 is to be formed are set so as to satisfy the following formula (3), wherein x1 is shorter than x2

$$T3(x1, y, z) > T3(x2, y, z) \qquad (3).$$

Specifically, in this embodiment, when a recording mark having length x1 or x2 is to be formed, in the case where the length y of a blank region to be formed after the formation of the recording mark and the length z of a next recording mark are the same, the time period T3 is set longer as the length x of the recording mark is shorter.

In a study done by the inventors of the present invention, it was found that in the case of recording data in the recording layer 21 of the optical recording medium 10 at a high linear recording velocity such as 4× speed, namely, about 14 m/sec, the phenomenon of the rear edge portion of the recording mark being extended toward the front edge portion thereof and the length of the recording mark becoming shorter became particularly prominent when the recording mark having a length of 3T was formed and that such a phenomenon was not observed when a recording mark having a length equal to or longer than 4T was formed.

Therefore, in the case of recording data in the recording layer 21 of the optical recording medium 10 at a high linear recording velocity such as 4× speed, namely, about 14 m/sec, when a recording mark having a length of 3T is to be formed after a blank region, the time period T1 is set so as to satisfy the above mentioned formula (2) and be shorter than that when a recording mark having a length equal to or longer than 4T is to be formed and when a recording mark having a length of 4T is to be formed after a blank region having the same length, the time period T1 is set so as to satisfy the above mentioned formula (2) and be shorter than that when a recording mark having a length equal to or longer than 5T. To the contrary, when a recording mark having a length equal to or longer than 5T is to be formed after a blank region having the same length, the time period T1 is set in a conventional manner.

Secondly, a time period T3 (x, y1, z) when a recording mark having length x is to be formed in the case of forming a blank region having length y1 is to be formed after the formation of the recording mark and a time period T3 (x, y2, z) when a recording mark having length x is to be formed in the case of forming a blank region having length y2 is to be formed after the formation of the recording mark are set so as to satisfy the following formula (4), wherein y1 is shorter than y2

$$T3(x, y1, z) > T3(x, y2, z) \qquad (4).$$

Specifically, in this embodiment, when the length x of a recording mark to be formed and the length z of a next recording mark to be sequentially formed are the same, the time period T3 is set longer as the length of a blank region to be formed after the formation of a recording mark is shorter.

In a study done by the inventors of the present invention, it was found that in the case of recording data in the recording layer 21 of the optical recording medium 10 at a high linear recording velocity such as 4× speed, namely, about 14 m/sec, the phenomenon of the rear edge portion of a recording mark being extended toward the front edge portion thereof and the length of the recording mark becoming shorter became particularly prominent when a blank region having a length of 3T was formed after the formation of a recording mark and that such a phenomenon was not observed when a blank region having a length equal to or longer than 4T was formed after the formation of a recording mark.

Therefore, in the case of recording data in the recording layer 21 of the optical recording medium 10 at a high linear recording velocity such as 4× speed, namely, about 14 m/sec, when a blank region having a length of 3T is to be formed after the formation of a recording mark, the period T3 is set so as to satisfy the above mentioned formula (4) and be longer than that when a blank region having a length equal to or longer than 4T is to be formed after the formation of a recording mark having the same length and when a blank region having a length equal to or longer than 4T is to be formed after the formation of a recording mark, the time period T3 is set in a conventional manner.

Thirdly, a time period T3 (x, y, z1) when a recording mark having a length of x is to be formed in the case of sequentially forming a next recording mark having a length of z1 and a time period T3 (x, y, z2) when a recording mark having a length of x is to be formed in the case of forming after the formation of a recording mark a blank region having a length of y and a next recording mark having a length of z2 are set so as to satisfy the following formula (5), wherein z1 is shorter than z2.

$$T3(x, y, z1) > T3(x, y, z2) \qquad (5).$$

Specifically, in this embodiment, when the length x of a recording mark to be formed and the length y of a blank region to be formed after the formation of the recording mark are the same, the time period T3 is set longer as the length z of a next recording mark is shorter.

In a study done by the inventors of the present invention, it was found that in the case of recording data in the recording layer 21 of the optical recording medium 10 at a high linear recording velocity such as 4× speed, namely, about 14 m/sec, the phenomenon of the rear edge portion of a recording mark being extended toward the front edge portion thereof and the length of the recording mark becoming shorter became particularly prominent when a next recording mark having a length of 3T was formed and that such a phenomenon was not observed when a next recording mark having a length equal to or longer than 4T was formed after the formation of a recording mark.

Therefore, in the case of recording data in the recording layer 21 of the optical recording medium 10 at a high linear recording velocity such as 4× speed, namely, about 14 m/sec, when the length z of a next recording mark to be formed is equal to 3T, the period T3 is set so as to satisfy the above mentioned formula (5) and be longer than that when a next recording mark having a length equal to or longer than 4T is to be formed after the formation of a recording mark and a blank region having the same lengths and when a next recording mark having a length equal to or longer than 4T is to be formed, the time period T3 is set in a conventional manner.

Further, in his embodiment, a value T3'(x, y, z: VL) obtained by normalizing the time period T3 when data are to be recording in the recording layer 21 of the optical recording medium 10 at a linear recording velocity of VL with a channel bit period and a value T3'(x, y, z: VH) obtained by normalizing the time period T3 when data are to be recording in the recording layer 21 of the optical recording medium 10 at a linear recording velocity of VH with a channel bit period are set so as to satisfy the following formula (6).

$$T3'(x, y, z: VL) < T3'(x, y, z: VH) \quad (6).$$

Specifically, in the case where the length x of a recording mark to be formed, the length y of a blank region to be formed after the formation of the recording mark and the length z of a next recording mark are the same, the value T3' obtained by normalizing the time period T3 with the channel bit period is set larger as the linear recording velocity is higher. Here, the value T3' obtained by normalizing the time period T3 with the channel bit period means k when the delay time period T3 is represented as k–T. In other words, in this embodiment, a value obtained by dividing an actual time of the time period T3 at the linear recording velocity VH by a period 1T at the linear recording velocity VH is set larger than the value obtained by dividing the time period T3 at the linear recording velocity VL by a period 1T at the linear recording velocity VL. Since in the case of recording data at a higher linear recording velocity, a time period between a fall time at which the level of the laser power is lowered from the level corresponding to the level of the recording power Pw to the level corresponding to the level of the bottom power Pb for forming the rear edge potion of a recording mark and a time at which the level of the laser power is raised from the level corresponding to the level of the bottom power Pb to the level corresponding to the level of the recording power Pw for forming the front edge portion of the second recording mark becomes shorter that that in the case of recording data at a lower linear recording velocity, thermal interference between adjacent recording marks tends to occur. However, according to this embodiment, since the value T3' obtained by normalizing the time period T3 with the channel bit period is set greater as the linear recording velocity is higher, even in the case of recording data in the optical recording medium at a higher linear recording velocity, it is possible to prevent adjacent recording marks from thermally interfering with each other and it is therefore possible to form a recording mark having a desired length, thereby recording data, and reduce jitter of a reproduced signal.

In this embodiment, the above identified formulae (1) to (6) set out above are recorded in the optical recording medium 10 in the form of wobbles or pre-pits as a program for setting data recording conditions together with data for identifying various data recording conditions such as linear recording velocities necessary for recording data.

According to this embodiment, since when a recording mark having a length b1 and a recording mark having a length b2 are to be formed after blank regions having the same lengths of a, the time period T1 is set shorter as the length b of the recording mark to be formed is shorter and when a recording mark having a length b is to be formed after a blank region having a length of a1 and a blank region having a length a2, the time period T1 is set longer as the length a of the blank region is shorter, it is possible to prevent the front edge portion of a recording mark from being offset and it is therefore possible to form a recording mark having a desired length.

Further, according to this embodiment, when a recording mark having a length x1 or a recording mark having a length x2 are to be formed, the time period T3 is set longer as the length x of the recording mark is longer in the case where a blank region having the same length y and a next recording mark having the same length z are to be formed after the formation of the recording mark and when a recording mark is to be formed before a blank region having a length of y1 or a blank region having a length y2, the time period T3 is set longer as the length y of the blank region is longer in the case where a recording mark having the same length x and a next recording mark having the same length z. Further, when a recording mark is to be formed before a next recording mark having a length of z1 or a next recording mark having a length of z2, the time period T3 is set longer as the length z of a next recording mark is shorter in the case where a recording mark having the same length x and a blank region having the same length y. Therefore, since it is possible to prevent the rear edge portion of a recording mark from extending toward the front edge portion thereof and the length of the recording mark from becoming shorter, it is possible to form a recording mark having a desired length, thereby recording data, and reduce jitter of a reproduced signal.

Figure 4:
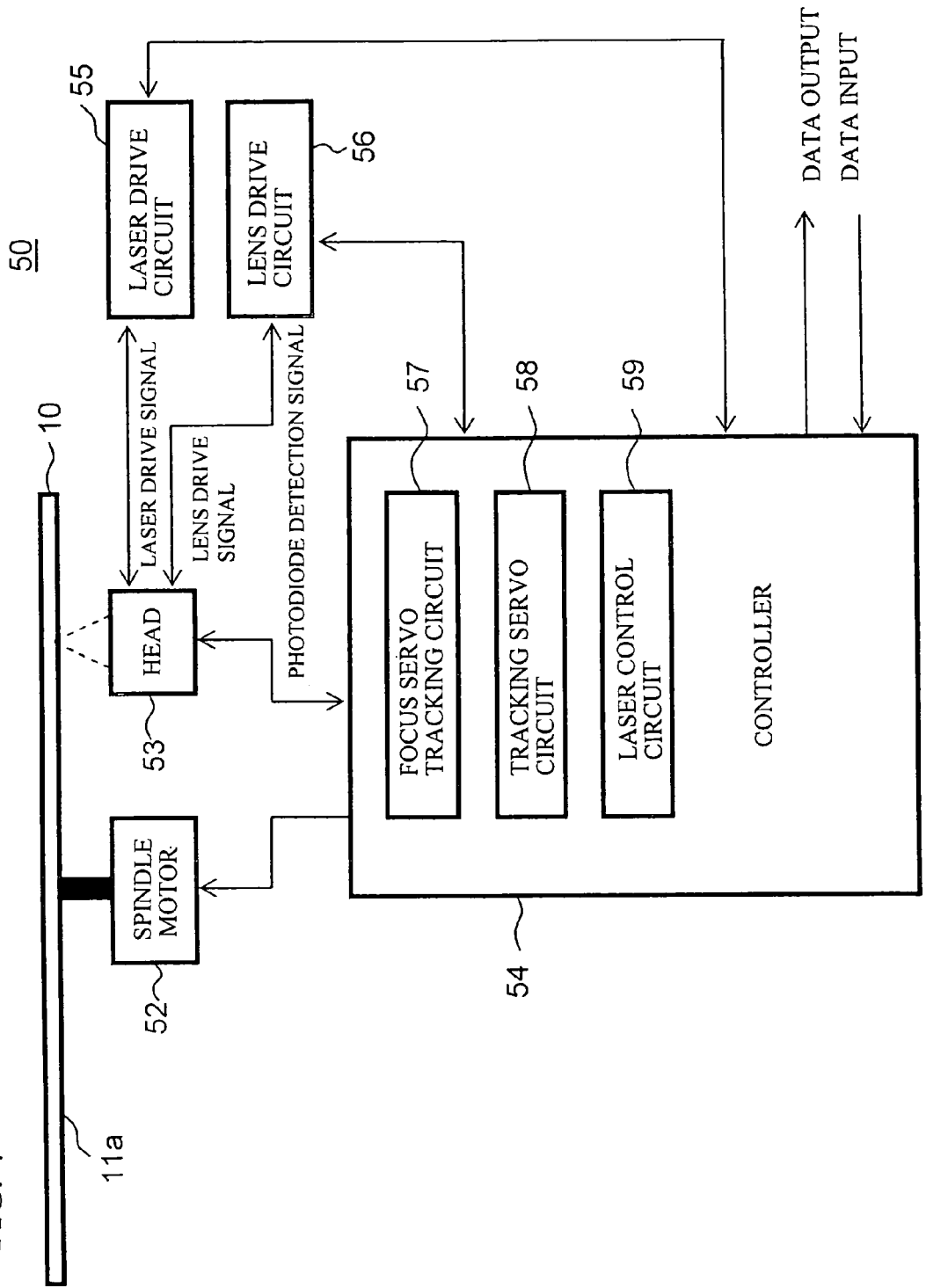
FIG. 4 is a block diagram showing a data recording and reproducing apparatus that is a preferred embodiment of the present invention.

FIG. 4 is a block diagram showing a data recording and reproducing apparatus that is a preferred embodiment of the present invention.

As shown in FIG. 4, a data recording apparatus 50 according to this embodiment includes a spindle motor 52 for rotating the optical recording medium 10, a head 53 for projecting a laser beam onto the optical recording medium 10 and receiving the light reflected by the optical recording medium 10, a controller 54 for controlling the operation of the spindle motor 52 and the head 53, a laser drive circuit 55 for feeding a laser drive signal to the head 53, and a lens drive circuit 56 for feeding a lens drive signal to the optical head 53.

As shown in FIG. 4, the controller 54 includes a focus servo tracking circuit 57, a tracking servo circuit 58 and a laser control circuit 59.

When the focus servo tracking circuit 57 is activated, a laser beam L10 is focused onto the first recording layer 31 of the rotating optical recording medium 10 and when the tracking servo circuit 58 is activated, the spot of the laser beam L10 automatically follows the track of the optical recording medium 10.

As shown in FIG. 4, each of the focus servo tracking circuit 57 and the tracking servo circuit 58 has an auto-gain control function for automatically adjusting the focus gain and an auto-gain control function for automatically adjusting the tracking gain. Further, the laser control circuit 59 is adapted to generate a laser drive signal to be supplied by the laser drive circuit 55.

As described above, the formula (1) to the formula (6) are recorded in the optical recording medium 10 in the form of wobbles or pre-pits as a program for setting data recording conditions together with data for identifying various data recording conditions such as linear recording velocities necessary for recording data. Therefore, prior to recording data, the laser control circuit 59 reads the program for setting data recording conditions recorded in the optical recording medium 10, determines a pulse train pattern of a laser power control signal based on the thus read program for setting data recording conditions in accordance with the length of a recording mark to be formed, lengths of blank regions to be formed before and after the recording mark and a recording mark to be next formed, produces a laser drive signal and causes the laser drive circuit 55 to output it to the head 53. Thus, a laser beam whose power is modulated in accordance with the pulse train pattern in which the time period T1 and the time period T3 are set so as to satisfy the formula (1) to the formula (6) is projected onto the recording layer 21 of the optical recording medium 10, thereby recording data in the optical recording medium 10. According to this embodiment, since the formula (1) to the formula (6) are recorded in the optical recording medium 10 together with data for identifying various data recording conditions such as linear recording velocities necessary for recording data and prior to recording data in the optical recording medium 10, the laser control circuit 59 reads the program for setting data recording conditions recorded in the optical recording medium 10, determines a laser power control signal based on the thus read program for setting data recording conditions in accordance with the length of a recording mark to be formed, lengths of blank regions to be formed before and after the recording mark and a recording mark to be next formed and controls the head 53 for projecting a laser beam onto the optical recording medium 10, it is possible to form a recording mark having a desired length in the recording layer 21 of the optical recording medium 10, thereby recording data therein, and it is possible to record data in the recording layer 21 of the optical recording medium 10 so that a reproduced signal having low jitter can be obtained.

The present invention has thus been shown and described with reference to a specific embodiment. However, it should be noted that the present invention is in no way limited to the details of the described arrangements but changes and modifications may be made without departing from the scope of the appended claims.

For example, in the embodiment shown in FIG. 2, although the optical recording medium 10 includes the recording layer 21 containing an organic dye, it is not absolutely necessary for an optical recording medium 10 to include a recording layer 21 containing an organic dye and a recording layer may be constituted by a recording film containing Si as a primary component and a recording film containing Cu as a primary component.

Further, in the above described embodiments, although the pulse train pattern of a laser power control signal is determined so that the time period T1 is set so as to satisfy the formula (1) and the formula (2) and the time period T3 is set so as to satisfy the formula (3) to the formula (5), it is not absolutely necessary for the time period T1 to be set so as to satisfy the formula (1) and the formula (2) and for the time period T3 to be set so as to satisfy the formula (3) to the formula (5) and it is sufficient for the time period T1 to be set so as to satisfy the formula (1) and the formula (2) or for the time period T3 to be set so as to satisfy the formula (3) to the formula (5).

Furthermore, in the above described embodiments, although the time period T1 is set so as to satisfy the formula (1) and the formula (2), it is not absolutely necessary for the time period T1 to be set so as to satisfy both the formula (1) and the formula (2) and it is sufficient for the time period T1 to be set so as to satisfy at least one of the formula (1) and the formula (2).

Moreover, in the above described embodiments, although the time period T3 is set so as to satisfy the formula (3) to the formula (5), it is not absolutely necessary for the time period T2 to be set so as to satisfy both the formula (3) to the formula (5) and it is sufficient for the time period T3 to be set so as to satisfy at least one of the formula (3) to the formula (5).

Further, in the above described embodiments, the program for setting data recording conditions are recorded in then the optical recording medium 10 in the form of wobbles and pre-pits, the program for setting data recording conditions may be stored in a memory of the data recording apparatus 50.

Furthermore, in the embodiment shown in FIG. 4, although the focus servo tracking circuit 57, the tracking servo circuit 58 and the laser control circuit 59 are incorporated into the controller 54, it is not absolutely necessary to incorporate the focus servo tracking circuit 57, the tracking servo circuit 58 and the laser control circuit 59 into the controller 54 and the focus servo tracking circuit 57, the tracking servo circuit 58 and the laser control circuit 59 may be provided separately from the control circuit 54 or it is possible to install software accomplishing the function of the focus servo tracking circuit 57, the tracking servo circuit 58 and the laser control circuit 59 into the controller 54.

Further, in the above described embodiments, although the explanation was made as to the case of recording data in a write-once type optical recording medium 10 of a DVD-R type, the present invention can be widely applied to not only the case of recording data in a write-once type optical recording medium 10 of a DVD-R type but also the cases of recording data in other optical recording media such as a write-once type optical recording medium 10 of a CD-R type, a next-generation type optical recording medium having a very thin light transmission layer. According to the present invention, it is possible to provide a method for recording data in a write-once type optical recording medium which can record data by forming a recording mark having a desired length and reduce jitter of a reproduced signal. Further, according to the present invention, it is possible to provide an apparatus for recording data in a write-once type optical recording medium which can record data by forming a recording mark having a desired length and reduce jitter of a reproduced signal. Furthermore, according to the present invention, it is possible to provide a write-once type optical recording medium which can record data by forming a recording mark having a desired length and reduce jitter of a reproduced signal.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method for recording data in a write-once type optical recording medium including a substrate and at least one recording layer formed on the substrate, the method comprising:

determining a pulse train pattern so that a level of a pulse is switched from a level corresponding to a level of a recording power to a level corresponding to a level of a bottom power in accordance with at least one of a length of a first recording mark, a length of a blank region to be formed immediately after formation of the first recording mark and a length of a second recording mark formed subsequent to the formation of the first recording mark;

modulating a power of a laser beam in accordance with the thus determined pulse train pattern;

projecting the laser beam onto the optical recording medium; and forming the first recording mark;

wherein a delay time period T3 between a fall time of a data pulse corresponding to the first recording mark and a time at which the level of a pulse is switched from the level corresponding to the level of the recording power to the level corresponding to the level of the bottom power in the pulse train pattern used for forming the first recording mark is set so as to satisfy a formula below, wherein T3 (x1, y, z) is a delay time period T3 in the case of forming the first recording mark having a length x1, the blank region having a length y after the formation of the first recording mark and the second recording mark having a length z and T3 (x2, y, z) is a delay time period T3 in the case of forming the first recording mark having a length x2, the blank region having a length y after the formation of the first recording mark and the second recording mark having a length z, where x1 is smaller than x2

$$T3(x1, y, z) > T3(x2, y, z).$$

2. A method for recording data in a write-once type optical recording medium including a substrate and at least one recording layer formed on the substrate, the method comprising:

determining a pulse train pattern so that a level of a pulse is switched from a level corresponding to a level of a recording power to a level corresponding to a level of a bottom power in accordance with at least one of a length of a first recording mark, a length of a blank region to be formed immediately after formation of the first recording mark and a length of a second recording mark formed subsequent to the formation of the first recording mark;

modulating a power of a laser beam in accordance with the thus determined pulse train pattern;

projecting the laser beam onto the optical recording medium; and forming the first recording mark;

wherein a delay time period T3 between a fall time of a data pulse corresponding to the first recording mark and a time at which the level of a pulse is switched from the level corresponding to the level of the recording power to the level corresponding to the level of the bottom power in the pulse train pattern used for forming the first recording mark is set so as to satisfy a formula below, wherein T3 (x, y1, z) is a delay time period T3 in the case of forming the blank region having a length y1 after the formation of the first recording mark having a length x and the second recording mark having a length z and T3 (x, y2, z) is a delay time period T3 in the case of forming the blank region having a length y2 after the formation of the first recording mark having a length x and the second recording mark having a length z, where y1 is smaller than y2

$$T3(x, y1, z) \leq T3(x, y2, z).$$

3. A method for recording data in an optical recording medium in accordance with claim 1, wherein a delay time period T3 between a fall time of a data pulse corresponding to the first recording mark and a time at which the level of a pulse is switched from the level corresponding to the level of the recording power to the level corresponding to the level of the bottom power in the pulse train pattern used for forming the first recording mark is set so as to satisfy a formula below, wherein T3 (x, y, z1) is a delay time period T3 in the case of forming the blank region having length y after the formation of the first recording mark having length x and the second recording mark having length z2 and T3 (x, y, z2) is a delay time period T3 in the case of forming the blank region having length y after the formation of the first recording mark having length x and the second recording mark having length z2, where z1 is smaller than z2

$$T3(x, y, z1) > T3(x, y, z2).$$

4. A method for recording data in a write-once type optical recording medium including a substrate and at least one recording layer formed on the substrate, the method comprising:

determining a pulse train pattern so that a level of a pulse is switched from a level corresponding to a level of a recording power to a level corresponding to a level of a bottom power in accordance with at least one of a length of a first recording mark, a length of a blank region to be formed immediately after formation of the first recording mark and a length of a second recording mark formed subsequent to the formation of the first recording mark;

modulating a power of a laser beam in accordance with the thus determined pulse train pattern;

projecting the laser beam onto the optical recording medium; and forming the first recording mark;

wherein a delay time period T3 between a fall time of a data pulse corresponding to the first recording mark and a time at which the level of a pulse is switched from the level corresponding to the level of the recording power to the level corresponding to the level of the bottom power in the pulse train pattern used for forming the first recording mark is set so as to satisfy a formula below, wherein T3 (x, y, z1) is a delay time period T3 in the case of forming the blank region having length y after the formation of the first recording mark having length x and the second recording mark having length z2 and T3 (x, y, z2) is a delay time period T3 in the case of forming the blank region having length y after the formation of the first recording mark having length x and the second recording mark having a length z2, where z1 is smaller than z2

$$T3(x, y, z1) > T3(x, y, z2).$$

5. The method for recording data in an optical recording medium in accordance with claim 1, wherein the time at which the level of the pulse of the pulse train pattern used for forming the first recording mark is switched from a level corresponding to the level of the bottom power to a level corresponding to the level of the recording power is determined in accordance with at least one of the length of the first recording mark and a length of a blank region to be formed before the formation of the first recording mark.

6. The method for recording data in an optical recording medium in accordance with claim 5, wherein a delay time period T1 between a rise time of a data pulse corresponding to the first recording mark and a time at which the level of a pulse is switched from the level corresponding to the level of the bottom power to the level corresponding to the level of the recording power in the pulse train pattern used for forming the first recording mark is set so as to satisfy a formula below, wherein T1 (a1, b) is a delay time period in the case of forming the first recording mark having length b after formation of a blank region having length a1 and T1 (a2, b) is a delay time period in the case of forming the first recording mark having length b after formation of a blank region having length a2, longer than a1

$$T1(a1, b) > T1(a2, b).$$

7. The method for recording data in an optical recording medium in accordance with claim 5, wherein a delay time period T1 between a rise time of a data pulse corresponding to the first recording mark and a time at which the level of a pulse is switched from the level corresponding to the level of the bottom power to the level corresponding to the level of the recording power in the pulse train pattern used for forming the first recording mark is set so as to satisfy a formula below, wherein T1 (a, b1) is a delay time period in the case of forming a recording mark having length b1 after formation of a blank region having length a and T1 (a, b2) is a delay time period in the case of forming a recording mark having length b2 longer than b1 after formation of a blank region having length a $$T1(a, b1) > T1(a, b2).$$

8. A method for recording data in a write-once type optical recording medium including a substrate and at least one recording layer formed on the substrate, the method comprising:

determining a pulse train pattern so that a level of a pulse is switched from a level corresponding to a level of a recording power to a level corresponding to a level of a bottom power in accordance with at least one of a length of a first recording mark, a length of a blank region to be formed immediately after formation of the first recording mark and a length of a second recording mark formed subsequent to the formation of the first recording mark;

modulating a power of a laser beam in accordance with the thus determined pulse train pattern;

projecting the laser beam onto the optical recording medium; and forming the first recording mark;

wherein in the case of forming the blank region having length y after the formation of the first recording mark having length x and the second recording mark having length z, a value T3'(x, y, z: VL) obtained by normalizing a delay time period T3 set for forming the first recording mark having length x and recording data at a linear recording velocity VL with a channel bit period and a value T3'(x, y, z: VH) obtained by normalizing a delay time period T3 set for forming the first recording mark having length x and recording data at a linear recording velocity VH higher than the linear recording velocity VL with the channel bit period are set so as to satisfy a following formula $$T3'(x, y, z: VL) > T3'(x, y, z: VH).$$

9. A method for recording data in a write-once type optical recording medium including a substrate and at least one recording layer formed on the substrate, the method comprising:

determining a pulse train pattern so that a level of a pulse is switched from a level corresponding to a level of a recording power to a level corresponding to a level of a bottom power in accordance with at least one of a length of a first recording mark, a length of a blank region to be formed immediately after formation of the first recording mark and a length of a second recording mark formed subsequent to the formation of the first recording mark;

modulating a power of a laser beam in accordance with the thus determined pulse train pattern;

projecting the laser beam onto the optical recording medium; and forming the first recording mark;

wherein the time at which the level of the pulse train pattern used for forming the first recording mark is switched from a level corresponding to the level of the bottom power to a level corresponding to the level of the recording power is determined in accordance with at least one of the length of the first recording mark and a length of a blank region to be formed before the formation of the first recording mark and wherein a delay time period T1 between a rise time of a data pulse corresponding to the first recording mark and a time at which the level of a pulse is switched from the level corresponding to the level of the bottom power to the level corresponding to the level of the recording power in the pulse train pattern used for forming the first recording mark is set so as to satisfy a formula below, wherein T1 (a1, b) is a delay time period in the case of forming the first recording mark having a length b after formation of a blank region having a length a1 and T1 (a2, b) is a delay time period in the case of forming the first recording mark having a length b after formation of a blank region having a length a2 longer than a1

$$T1(a1, b) > T1(a2, b).$$

10. A method for recording data in an optical recording medium constituted so as to project a laser beam whose power is modulated in accordance with a pulse train pattern including at least a pulse whose level is set to a level corresponding to a level of a recording power and a pulse whose level is set to a level corresponding to a level of a bottom power, onto a write; once type optical recording medium including a substrate and at least one recording layer formed on the substrate and form at least two recording marks in the at least one recording layer, thereby recording data, the method for recording data in an optical recording medium comprising a step of determining a pulse train pattern so that a level of a pulse is switched from a level corresponding to the level of the recording power to a level corresponding to the level of the bottom power in accordance with at least one of a length of a first recording mark, a length of a blank region to be formed immediately after formation of the first recording mark and a length of a second recording mark formed subsequent to the formation of the first recording mark, modulating a power of laser beam in accordance with the thus determined pulse train pattern, projecting the laser beam onto the at least one recording layer and forming the first recording mark, wherein the time at which the level of the pulse of the pulse train pattern used for forming the first recording mark is switched from a level corresponding to the level of the bottom power to a level corresponding to the level of the recording power is determined in accordance with at least one of the length of the first recording mark and a length of a blank region to be formed before the formation of the first recording mark and wherein a delay time period T1 between a rise time of a data pulse corresponding to the first recording mark and a time at which the level of a pulse is switched from the level corresponding to the level of the bottom power to the level corresponding to the level of the recording power in the pulse train pattern used for forming the first recording mark is set so as to satisfy a formula below, wherein T1 (a, b1) is a delay time period in the case of forming a recording mark having a length b1 after formation of a blank region having a length a and T1 (a, b2) is a delay time period in the case of forming a recording mark having a length b2 longer than b1 after formation of a blank region having a length a $$T1(a, b1) > T1(a, b2).$$

11. A method for recording data in an optical recording medium in accordance with claim 1, the shortest recording mark.

12. A method for recording data in an optical recording medium in accordance with claim 2, wherein the first recording mark is the shortest recording mark.

13. A method for recording data in an optical recording medium in accordance with claim 4, wherein the first recording mark is the shortest recording mark.

14. A method for recording data in an optical recording medium in accordance with claim 8, wherein the first recording mark is the shortest recording mark.

15. A method for recording data in an optical recording medium in accordance with claim 9, wherein the first recording mark is the shortest recording mark.

16. A method for recording data in an optical recording medium in accordance with claim 10, wherein the first recording mark is the shortest recording mark.

* * * * *

UNITED STATES PATENT AND TRADEMARK OFFICE
CERTIFICATE OF CORRECTION

PATENT NO. : 7,193,949 B2 Page 1 of 1
APPLICATION NO. : 10/527485
DATED : March 20, 2007
INVENTOR(S) : Syuji Tsukamoto et al.

It is certified that error appears in the above-identified patent and that said Letters Patent is hereby corrected as shown below:

Page 1
Item 54, "METHOD FOR RECORDING DATA ON OPTICAL RECORDING MEDIUM, DEVICE FOR RECORDING DATA ON OPTICAL RECORDING MEDIUM, AND OPTICAL RECORDING MEDIUM" should read as --METHOD FOR RECORDING DATA IN AN OPTICAL RECORDING MEDIUM, AN APPARATUS FOR RECORDING DATA IN AN OPTICAL MEDIUM AND AN OPTICAL RECORDING MEDIUM--.

Column 21
Line 35, "$T3\ (x,y1,z) \leq T3\ (x,y2,z)$" should read as --$T3\ (x,y1,z) > T3\ (x,y2,z)$--.

Column 23
Line 63, "$T3'(x,y,z : VL) > T3'(x,y,z : VH)$" should read as
--$T3'(x,y,z : VL) < T3'(x,y,z : VH)$--.

Column 24
Line 47, "write;once" should read as --write-once--.

Column 25
Line 19, "$T1\ (a,b1) > T1\ (a,b2)$" should read as --$T1\ (a,b1) < T1\ (a,b2)$--.

Column 26
Line 2, "claim 1, the" should read as --claim 1, wherein the first recording mark is the--.

Signed and Sealed this

Fourth Day of November, 2008

JON W. DUDAS
*Director of the United States Patent and Trademark Office*

UNITED STATES PATENT AND TRADEMARK OFFICE
CERTIFICATE OF CORRECTION

PATENT NO. : 7,193,949 B2 Page 1 of 1
APPLICATION NO. : 10/527485
DATED : March 20, 2007
INVENTOR(S) : Syuji Tsukamoto et al.

It is certified that error appears in the above-identified patent and that said Letters Patent is hereby corrected as shown below:

Page 1
Item 54 and Column 1, lines 1-5, "METHOD FOR RECORDING DATA ON OPTICAL RECORDING MEDIUM, DEVICE FOR RECORDING DATA ON OPTICAL RECORDING MEDIUM, AND OPTICAL RECORDING MEDIUM" should read as --METHOD FOR RECORDING DATA IN AN OPTICAL RECORDING MEDIUM, AN APPARATUS FOR RECORDING DATA IN AN OPTICAL MEDIUM AND AN OPTICAL RECORDING MEDIUM--.

Column 21
Line 35, "$T3\ (x,y1,z) \leq T3\ (x,y2,z)$" should read as --$T3\ (x,y1,z) > T3\ (x,y2,z)$--.

Column 23
Line 63, "$T3'(x,y,z : VL) > T3'(x,y,z : VH)$" should read as
--$T3'(x,y,z : VL) < T3'(x,y,z : VH)$--.

Column 24
Line 47, "write;once" should read as --write-once--.

Column 25
Line 19, "$T1\ (a,b1) > T1\ (a,b2)$" should read as --$T1\ (a,b1) < T1\ (a,b2)$--.

Column 26
Line 2, "claim 1, the" should read as --claim 1, wherein the first recording mark is the--.

This certificate supersedes the Certificate of Correction issued November 4, 2008.

Signed and Sealed this

Twenty-fifth Day of November, 2008

JON W. DUDAS
*Director of the United States Patent and Trademark Office*